United States Patent [19]

Pcolinsky, Jr.

[11] 4,317,889
[45] Mar. 2, 1982

[54] INTUMESCENT FLEXIBLE POLYURETHANE FOAM

[75] Inventor: Michael P. Pcolinsky, Jr., Hazleton, Pa.

[73] Assignee: Tenneco Chemicals, Inc., Saddle Brook, N.J.

[21] Appl. No.: 200,129

[22] Filed: Oct. 24, 1980

[51] Int. Cl.$^3$ .................... C08G 18/14; C08G 18/38
[52] U.S. Cl. .................... 521/107; 521/123; 521/131; 521/166; 521/906
[58] Field of Search ............ 521/107, 123, 131, 166, 521/906

[56] References Cited

U.S. PATENT DOCUMENTS

| | | | |
|---|---|---|---|
| 3,772,222 | 11/1973 | Steward et al. | 521/906 |
| 3,909,464 | 9/1975 | Anorga et al. | 521/123 |
| 4,147,678 | 4/1979 | Mag et al. | 521/906 |
| 4,165,411 | 8/1979 | Marans et al. | 521/107 |
| 4,210,452 | 7/1980 | Nicholson et al. | 521/107 |
| 4,237,182 | 12/1980 | Fulmer et al. | 521/123 |

Primary Examiner—H. S. Cockeram
Attorney, Agent, or Firm—James P. Scullin

[57] ABSTRACT

Flexible, resilient, polyurethane foam having improved flame retardancy and intumescent properties is prepared from a reaction mixture comprising a polyester polyol, an organic polyisocyanate, a blowing agent, a surfactant, a catalyst, a melamine derivative wherein one or more hydrogens have been replaced by a methylol and/or lower alkoxymethyl group, a flame retardant, and hydrated alumina. In a preferred embodiment, the hydrated alumina is predispersed in a mixture comprising the melamine derivative, the flame retardant, and a low-viscosity linear polyester polyol.

28 Claims, No Drawings

INTUMESCENT FLEXIBLE POLYURETHANE FOAM

BACKGROUND OF THE INVENTION

1. Field of the Invention

This invention relates to improvements in flexible, resilient, polyurethane foams, and in particular to improvements in the characteristics of such foams when subjected to fire. Flexible resilient polyurethane foams are made by the reaction of polyols and organic polyisocyanates in the presence of one or more blowing agents, one or more surfactants, and one or more catalysts. The foams find a variety of uses, such as carpet underlay, textile innerlining, mattresses, pillows, furniture padding, cushions, automobile crash pads, and insulation. Unless formulated with special additives, polyurethane foams burn readily when ignited. It is known in the art to add various flame retardant chemicals to polyurethane foam forming reaction mixtures, in particular to add halogenated esters of phosphorus. This has resulted in some improvement in the flammability properties, the extent of burning after ignition by a low intensity source being reduced and the foams may even be made self-extinguishing to some degree in small scale laboratory tests; but while combustion does occur the foam melts and may drip flaming embers which may ignite other flammable materials in the vicinity and thus cause the fire to spread. In order to overcome this problem other additives have been added to polyurethane foam-forming reaction mixtures to render the finished foams intumescent, or capable of producing a char, once they have been ignited. Such foams are less prone to the development of flaming, dripping, embers during combustion, and produce a char which can act as a thermal insulating barrier and thus slow or prevent the spread of the fire.

2. Description of the Prior Art

In U.S. Pat. No. 3,681,273 the use of a mixture of a nitrogen and phosphorus containing compound such as monoammonium phosphate, melamine phosphate, or urea phosphate, and an N-alkylol substituted polyalkylene polyamine as an additive to conventional flexible polyurethane foam reaction mixtures is disclosed. The resultant foams are flame-retardant, intumescent, and non-burning.

U.S. Pat. No. 3,803,063 discloses a flexible polyurethane foam reaction mixture containing an additive comprising a nitrogen and phosphorus containing compound such as monoammonium phosphate or an ammonium phosphate and a polycondensate of polymerized unsaturated fatty acids with aliphatic amines.

U.S. Pat. No. 3,897,372 discloses hydrophilic polyurethane foams having flame retardancy and reduced smoke density, prepared by reacting a resin prepolymer, water, alumina hydrate, boric acid, and a melamine derivative. Optionally, the reaction mixture can also contain silica.

In U.S. Pat. No. 4,139,501, Rudner, Noone and Pauly disclose flexible polyurethane foams having reduced tendency to form burning embers when ignited and burned, produced by incorporating into the foam-forming reaction mixture a melamine derivative wherein one or more hydrogen atoms have been replaced by hydroxymethyl and/or lower alkoxymethyl groups. Alternatively, a halogenated phosphorus ester can also be included in the reaction mixture.

U.S. Pat. No. 4,143,029 discloses dripless, fire-retarded polyurethane elastomers comprising a blend of an elastomer with a hexaalkoxymethylmelamine, a trihydrocarbonylmelamine, and an aromatic bismaleimide or aromatic bismaleimide generator.

U.S. Pat. No. 4,162,276 discloses non-dripping, self-extinguishing, polyurethane elastomers comprising a blend of an elastomer with a hexaalkoxymethylmelamine, an organic halogen-containing compound such as a chlorinated paraffin, and a P-substituted phosphocyclopentane 1-oxide.

U.S. Pat. No. 4,197,373 discloses polyether polyurethane foams prepared from conventional foam-forming reaction mixtures containing as a flame retardant a melamine derivative having a 2,2,2-trichloromethyl group, such as N,N'-bis(1-hydroxy-2,2,2-trichloroethyl)melamine.

SUMMARY OF THE INVENTION

This invention provides flexible, resilient, polyester polyurethane foams with substantially improved char-forming, or intumescent, properties, as compared with prior art polyurethane foams such as those disclosed in U.S. Pat. No. 4,139,501. The improvement is obtained by adding to a conventional polyester polyurethane foam-forming reaction mixture at least one melamine derivative, at least one flame retardant, and hydrated alumina. The melamine derivatives are those in which one or more hydrogen atoms of melamine have been replaced by hydroxymethyl and/or lower alkoxymethyl groups. The amounts of melamine derivatives used are generally substantially greater than the amounts used in the foams of U.S. Pat. No. 4,139,501. The amounts of flame retardant used are also generally substantially greater than the amounts used in U.S. Pat. No. 4,139,501. In order to incorporate the large amounts of hydrated alumina used into the foam-forming reaction mixture, a premix of pumpable viscosity is prepared by dispersing the alumina in a synergistic viscosity modifier composition.

The flexible foams of U.S. Pat. No. 4,139,501 were a significant step forward in the art by virtue of their ability to produce a char when ignited and to resist the formation of dripping embers when ignited. However, still more stringent performance requirements have recently been put on flexible urethane foams with respect to resistance to burning, especially for such uses as institutional mattresses and upholstery, and more rigorous test methods have been developed to evaluate them. Although these prior art foams give good results when tested by ASTM D 1692-68 or by a modification of UL94 published by Underwriters Laboratories (the modification being to measure flame time from the start of ignition rather than 60 seconds after ignition), and provide adequate flame resistance for many applications, they have been found to be inadequate when evaluated by the recent more rigorous test procedures. One example of such a method is exposure of a vertically-held piece of foam to the flame of a propane gas blowtorch for periods of time ranging from 10 seconds to 3 minutes. When tested by this method, conventional urethane foams that do not contain flame retardants, as well as those containing conventional levels of such flame retardants as halogenated phosphate esters, ignite and continue to burn after the blowtorch flame is removed until they are completely consumed. The char-forming foams made according to U.S. Pat. No. 4,139,501 generally continue to burn for a period of time after the blowtorch flame is removed, although they resist being totally consumed and usually will be self-extinguishing. Depending on the thickness of the test piece however, the foam may be severely damaged. By way of example, a test piece having a thickness of one inch or less may have a hole burned completely through it. In contrast to this when tested by exposure to a blowtorch the intumescent foams of the present invention cease to burn within 0-10 seconds after removal of the torch flame. There is little damage to the interior of the foam due to the heavy char layer which forms.

The foams of this invention can be used in most or all of the applications where conventional flexible foams have heretobefore been used. These novel foams can, if desired, be peeled, split, or sliced into sheets of any desired thickness using techniques well-known in the art, and the flexible sheets also can be rolled up for convenient storage and transportation. Like conventional flexible polyurethane foams, the products of the present process can be laminated to textiles or plastic substrates by conventional methods, such as flame-lamination or by means of adhesives.

DETAILED DESCRIPTION OF THE INVENTION

The objective of this invention is accomplished by incorporating into an otherwise conventional polyester polyurethane foam-forming reaction mixture a high level of a melamine derivative, an unusally high level of a flame retardant, and a high level of hydrated alumina (also known as alumina trihydrate, aluminum hydroxide, aluminum hydrate, and hydrated aluminum oxide).

The melamine derivatives used in the practice of this invention are those compounds having the formula

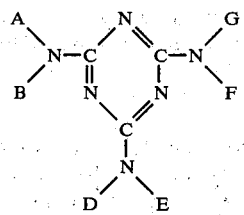

In the preceding formula, A, B, D, E, F and G are hydrogen, hydroxymethyl(methylol) or ROCH$_2$— wherein R is an alkyl radical containing from one to four carbon atoms, such as methyl, ethyl or t-butyl. At least one of A, B, D, E, F and G is hydroxymethyl or ROCH$_2$—. Examples of compounds falling within the scope of the formula are tris-(hydroxymethyl)melamine, tris-(hydroxymethyl)-tris-(methoxymethyl)melamine, hexa-(methoxymethyl)melamine, hexa-(hydroxymethyl)melamine and tetra-(n-butoxymethyl)melamine. In general, the amount of compound or compounds of the formula used will be from about 10 to about 30 parts by weight per 100 parts by weight of the polyester polyol present in the mixture to be foamed, but greater or lesser amounts can be used without departing from the scope of the invention. The preferred amount is from about 15 to about 25 parts by weight, per 100 parts by weight of the polyester polyol. The melamine derivatives can be used either as solutions or dispersions in water or other solvents, or as essentially 100% active materials without solvent. It is preferred to use the latter form, in the absence of water, to provide greater latitude in formulating a reaction mixture. When water is used as a blowing agent, it is preferred to add it separately rather than as a solvent for the melamine compound. A particularly preferred melamine derivative is hexamethyoxymethylmelamine, which is readily obtainable in a form free, or substantially free, from water. Although it is preferred to use a single melamine derivative, for simplicity in formulating, it may sometimes be desirable to use two or more, and such combinations are included in the scope of the invention.

Suitable flame retardants are those conventionally used in the art of making flexible polyurethane foams, and include tri-esters of phosphoric acid, halogenated tri-esters of phosphoric acid, halogenated hydrocarbons, and the like.

Examples of suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloropropyl)phosphate, bis(dichloropropyl)tribromoneopentyl phosphate, tetrakis(2-chloroethyl)ethylene diphosphate (sold by Olin Chemicals as THERMOLIN ® 101), FYROL ® EFF (oligomeric chloroalkyl phosphate, sold by Stauffer Chemical Co.), tricresyl phosphate, cresyl diphenyl phosphate, chlorinated paraffin, and brominated paraffin. Halogenated phosphates are preferred flame retardants in the practice of this invention, especially tris(1,3-dichloropropyl)phosphate, tris(2-chloroethyl)phosphate, FYROL ® EFF, and tetrakis(2-chloroethyl)ethylene disphosphate, with the first and last-named being particularly preferred. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range, from about 20 to about 60 parts by weight per 100 parts by weight of polyol in the reaction mixture. It is preferred to use from about 20 to about 40 parts by weight.

The amount of hydrated alumina can be varied from about 50 parts by weight to about 200 parts by weight per 100 parts by weight of polyester polyol in the foam-forming reaction mixture, with the preferred range being from about 90 to about 120 parts by weight. Although the particle size of the alumina hydrate is not critical, too coarse a particle size may be ineffective in producing a suitable intumescent foam, and too fine a particle size may produce too high a viscosity and thus cause difficulties in blending the reaction mixture. Grades of hydrated alumina having an average particle size of 16 microns or less are generally not desirable since they tend to produce too high a viscosity, and grades containing coarse particles (for example, in which 5-20% is retained on a 100 mesh screen, 65-90% is retained on a 200 mesh screen and 90-98% is retained on a 325 mesh screen) may lead to some shrinkage of the foam. A suitable grade of hydrated alumina, for example, is one in which 1-3% is retained on a 200 mesh screen and 80-85% is retained on a 325 mesh screen, and in which the average particle size is 20-30 microns. Some commercially available grades that are satisfactory for use in this invention are Alcoa C-30BF, Imco 753, Southern Talc 753, Reynolds RH 130, and Alcoa C-230.

Previous to the present disclosure, it has been found to be very difficult or virtually impossible to incorporate high levels of fillers such as hydrated alumina into polyester polyurethane foam, especially when the foam is made by the one-shot process. The polyester polyols are generally of high viscosity, and attempts to disperse large quantities of particulate fillers in such polyols led to viscosities which were difficult or impossible to pump, or to be handled in any manner on a practical, commercial, scale. It has now been found that by the use of certain viscosity modifiers or synergists, relatively low viscosity and pumpable dispersions of hydrated alumina can be made. These novel dispersions are readily handled and pumped, and are quite suitable for use in the one-shot foam-making method. The dispersions and the method of making them constitute important features of this invention. In order to obtain a uniform distribution of hydrated alumina throughout the reaction mixture and the resultant foam, it is essential to form a premix of the hydrated alumina in one or more, or a portion thereof, of the liquid components of the reaction mixture. Any of the known types of apparatus for dispersing particulate solids in liquids can be used.

Hydrated alumina can be uniformly dispersed in the high viscosity polyester polyol conventionally used in the manufacture of polyurethane foam, such polyester polyols typically having a viscosity in the range of 20,000 cps at 25° C., but the dispersions have extremely high viscosities, especially when the hydrated alumina level is greater than about 50–75 parts by weight per 100 parts by weight of polyester (50–75 PHR). Such dispersions can be used, although with some difficulty, in making hand batches in the laboratory but are impractical for use in the usual apparatus for making foam by the continuous one-shot process. Special pumps must be employed in order to utilize the high-viscosity dispersions in such equipment.

It has now been found that much lower viscosity dispersions can be made by dispersing the hydrated alumina in a blend of all of the polyester polyol, the flame retardant (either a single flame retardant or a mixture of two or more) and the melamine derivative. These dispersions can be used in conventional continuous foam-making equipment without requiring modification such as the installation of special pumps, and their preparation and use constitutes one preferred process for making the novel intumescent foams of this invention.

It has also now been found that even lower viscosity dispersions, having viscosities in some cases as low as about 17,000–25,000 cps, can be made by dispersing the hydrated alumina in a blend which comprises all of the flame retardant (or retardants if two or more are used), the melamine derivative, and a low-viscosity, linear, polyester polyol. These dispersions are readily pumpable and can be introduced as a separate stream to the mixing head of a conventional apparatus for the continuous one-shot manufacture of urethane foam. They are not only lower in viscosity, which is of itself an advantage, but their use is more convenient for use in commercial manufacture of foam since it is not necessary to handle the large volume of high viscosity polyester polyol in order to disperse the hydrated alumina. The process wherein such dispersions are made and used in foam making is a particularly preferred embodiment of the present invention.

The low-viscosity, linear (i.e., difunctional) polyester polyols that are used in preparing the dispersions can be made by the reaction of a glycol such as diethylene glycol with an aliphatic dibasic acid such as adipic acid, and have viscosities in the range of about 400–500 cps at 25° C. Some examples of suitable commercial products are LEXOREZ 1100-220 sold by Inolex Corp., and L-1217 and FOMREZ 11-225, both sold by Witco. The amount of the low-viscosity linear polyester polyol to be used will vary depending on the amount of hydrated alumina to be dispersed, the amount and type of flame retardant or retardants to be used, the amount and structure of the melamine derivative, and the viscosity that is desired in the dispersion. It is preferred to use from about 5 to about 20 parts by weight per 100 parts by weight of high viscosity polyester polyol (i.e., from about 5 to about 20 PHR) although greater or lesser amounts can be used if desired without departing from the scope of the invention. It is particularly preferred to use from about 10 to about 15 PHR. The dispersions thus will comprise from about 5 to about 20 parts by weight low-viscosity linear polyester polyol, from about 20 to about 60 parts by weight of at least one halogenated phosphate ester flame retardant, from about 10 to about 30 parts by weight melamine derivative, and from about 50 to about 200 parts by weight hydrated alumina.

The low-viscosity, linear, polyester polyol not only functions as a dispersant for the hydrated alumina, but quite surprisingly it also functions to enhance the flame retardant and intumescent properties of the resultant foam, as shown by a highly significant improvement in Flame Spread Index when tested by the method of ASTM E-162. This is a completely unexpected result, since the linear polyester polyol has no inherent resistance to burning and would be expected to be totally consumed by fire.

The mixture to be foamed will include at least one polyester polyol, at least one organic polyisocyanate, at least one blowing agent, and at least one catalyst. Alternatively, the mixture to be foamed can also comprise other known additives and compounding ingredients for the preparation of polyurethane foams. Such additives and ingredients include, by way of example, pigments or other colorants, surfactants, foam stabilizers, cell openers, lubricants, microbicides, and so forth.

The polyester polyol reactants useful in the present invention include any conventionally used in the preparation of flexible and semiflexible urethane polymer foams. The polyhydric polyester reactant usually has a molecular weight of at least about 400 and optimally between about 500 and about 5000. The hydroxyl number of the compound is correspondingly in the range of from about 15 to about 300. The preferred average hydroxyl functionality for the polyester resins is from about 2.2 to 2.8.

The range of polyester polyol compounds useful for preparing the flexible polyurethane foams in the present inventions is well known to the art, and the polyester polyol compounds can be prepared by, for example, the reaction of a polyhydric alcohol with a polycarboxylic acid compound, each containing from two to about 36 or more carbon atoms in the molecule. The polycarboxylic acid includes such acid precursors as the corresponding acid anhydrides or acid halides or even, for example, alkyl esters. The preferred acids are the dicarboxylic acids containing from 4 to 36 carbon atoms in the molecule. Examples of such preferred carboxylic acid compounds which can be used include, for example, aromatic acids, such as phthalic acid, terephthalic acid, tetrachlorophthalic acid, cycloaliphatic acids such as dimerized linoleic acid, maleated and fumarated resin acids, and cyclohexane-1,4-diacetic acid, but especially the aliphatic acids such as itaconic, oxydipropionic, succinic, glutaric, adipic, azelaic, suberic and sebacic acids, or combinations of such acids. The polyester polyols can also be prepared from the corresponding lactones, such as gamma-butyrolactone or epsilon-caprolactone for example, by self-condensation on a diol or triol initiator.

The polyhydric alcohol used in the preparation of the polyester polyol is generally a mixture of a dihydric and a trihydric alcohol. Preferably, a mixture of polyols, the major portion having a functionality of two and the minor a functionality of three, is used. This mixture of di- and tri-functional polyols is utilized to give an average functionality of between two and three. A functionality of greater than two is desirable to provide cross-linking in the reaction between the polyester polyol and the polyisocyanate to form a flexible, but strong foam. It has been found to be preferable to obtain this additional functionality by using trihydric or higher polyols in a minor amount when forming the polyester polyol.

It is recognized that certain compounds which are considered by those skilled in the art as polyester resins also contain ether linkages, e.g., esters prepared from dipropylene glycol. However, the primary character of such resins is considered to be that of an ester.

The organic polyisocyanates useful in the present invention are also conventional. They contain at least two isocyanate groups per molecule; preferably, the isocyanate mixture selected has an isocyanate functionality of from 2.0 to 3.0. The useful isocyanates are the aromatic polyisocyanates alone or admixed with aliphatic, cycloaliphatic or heterocyclic polyisocyanates.

The aromatic diisocyanates are generally the least expensive and most suitable polyisocyanates available. The aromatic diisocyanates, especially the tolylene diisocyanate isomers, are used commercially in the preparation of flexible foam by the one-shot, continuous slabstock process. However, for certain purposes, other polyisocyanates, especially the aliphatic, aralkyl and cycloalkyl polyisocyanates, have valuable properties and can be used, if desired, in admixture with, e.g. tolylene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylyl diisocyanate, p-xylyl diisocyanate, cyclohexyl-1, 4-diisocyanate, dicyclohexylmethane-4, 4'-diisocyanate, m-phenylene diisocyanate, p-phenylene diisocyanate, 3-(alphaisocyanatoethyl)-phenyl isocyanate, 2,6-diethylbenzene-1, 4-diisocyanate, diphenyldimethylmethane-4, 4'-diisocyanate, ethylidene diisocyanate, propylene-1,2-diisocyanate, cyclohexylene-1, 2-diisocyanate, 2,4-tolylene diisocyanate, 2,6-tolylene diisocyanate, 3,3'-dimethyl-4,4'-biphenylene diisocyanate, 3,3'-dimethoxyl-4,4'-biphenylene diisocyanate, 3,3-diphenyl-4, 4'-biphenylene diisocyanate, 4,4'-biphenylene diisocyanate, 3,3'-dichloro-4,4'-biphenylene diisocyanate, 1,5-naphthalene diisocyanate, isophorone diisocyanate, m-xylyene diisocyanate, triazine triisocyanate, triketotrihydrotris(isocyanatophenyl)triazine and tris-(isocyanatophenyl)methane. The preferred isocyanates in the practice of this invention are the tolylene diisocyanates, especially mixtures of the 2,4 and 2,6 isomers such as those containing 65% of the 2,4 isomer and 35% of the 2,6 isomer (TDI 65/35), and those containing 80% of the 2,4 isomer and 20% of the 2,6 isomer (TDI 80/20). In the manufacture of conventional polyester polyurethane foams the more expensive TDI 65/35 is often used because the reaction mixture tends to rise and gel faster and the resultant foam tends to have a more open cell structure. Surprisingly, in the practice of this invention the less expensive TDI 80/20 gives entirely satisfactory rise and gel time as well as a satisfactory degree of open cell formation, and is a particularly preferred isocyanate.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the flexible polyurethane foam is water. The advantages of using water are low cost and the stability which the use of water adds to the foam-making. The water-isocyanate reaction not only produces gas for blowing, but also produces urea-containing polymer very quickly, contributing materially to early polymer strength needed to hold the gas inside, to form foam. The water-isocyanate reaction also provides much of the heat required for satisfactory curing of the foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about $-40°$ C. and $+100°$ C. including methylene chloride, the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures, and the like.

As is conventional in the art pertaining to the manufacture of polyurethane foam, the reaction mixture will also contain a catalyst. Catalysts suitable for use in this invention are conventional ones in the polyurethane foam art, and include tertiary amines and metallic compounds. Useful tertiary amines include: N-alkylmorpholines such as N-ethylmorpholine; N,N-dialkylcyclohexylamines where the alkyl groups are methyl, ethyl, propyl, butyl, etc.; trialkylamines such as triethylamine, tripropylamine, tributylamine, triamylamine, etc.; triethylenediamine, bis(2-dimethylaminoethyl)ether; N,N dimethylaminoethyl-N',N'-dimethylaminopropyl ether; the tertiary amine sold by Jefferson Chemical Co., under the name THANCAT DD: and other tertiary amines well known in the art. Useful metal compounds include those of bismuth, lead, titanium, iron, antimony, uranium, cadmium, cobalt, aluminum, mercury, zinc, nickel, cerium, vanadium, copper, manganese, zirconium, tin, and others. Tin compounds are particularly useful, some examples being stannous octoate, (stannous 2-ethylhexoate),stannous oleate, dibutyltin bis (2-ethylhexoate), and dibutyltin dilaurate. The levels of catalyst used are conventional.

As is also conventional in the art of manufacturing polyurethane foam, the reaction mixture can contain a surfactant if desired. The surfactant can be an organosilicon surfactant (also commonly termed a silicon surfactant) or it can be a surfactant which does not contain silicon. It is generally preferred, in carrying out this invention, to use the latter type although both types can be used in combination if desired. Regardless of the type used, either a single surfactant or a combination of two or more can be used. The surfactant per se does not form a part of this invention. As those skilled in the art will be aware, surfactants for use in making urethane foams are sold by many suppliers, generally as proprietary products without disclosure of exact chemical composition or structure. The amounts used will vary from about 0.01 to about 1 part, or more, per 100 parts by weight of the polyol (0.01 to 1 PHR). One such commercial, non-silicon containing, surfactant that is suitable in carrying out this invention is sold by Witco as M66–82 and is described as a mixture of fatty acid amides.

In carrying out this invention the index, the stoichiometric balance between the equivalent weights of the polyisocyanate and of the total of polyol and water (if used), can vary from a negative index (less than 100, representing a shortage of polyisocyanate) to a positive index (greater than 100, representing an excess of polyisocyanate). The index will generally range from about 95 to about 105, but even lower or higher indices can be used if desired. It has been found that reaction mixtures having an index of at least 100 yield foams having better flame retardance and intumescent properties than those having an index of less than 100. Thus an index of at least 100 is a preferred mode.

The polyurethane foams according to this invention can be prepared by any of the methods known in the art, including prepolymer, quasi-prepolymer, and one-shot, batchwise or continuous. It is preferred to prepare them continuously by the one-shot method in the form of large buns having a rectangular or circular cross-section which can then be split or peeled into sheets of suitable thickness. For example, buns having a circular cross-section and suitable for peeling are disclosed in U.S. Pat. No. 3,874,988, to Buff et al. The polyurethane foams can be essentially completely open-celled, such as those disclosed in U.S. Pat. No. 3,748,288 to Winkler et al or U.S. Pat. No. 3,884,848 to Ricciardi et al, or reticulated foams made by any of the reticulation methods known in the art. The foams can also be partly open-celled, or predominently closed-celled.

Of the following examples, one of which is a comparative example according to the prior art and others of which are according to the present invention, those made according to the present invention are illustrative thereof but not limitative thereof. In these examples, all amounts shown are parts by weight.

Test methods used for evaluating the flame retardant and intumescent properties of the foams include: a modification of UL 94, Standard for Tests for Flammability of Plastic Materials for Parts in Devices and Appliances, published by Underwriters Laboratories Inc.; ASTM E162–78 Radiant Panel Test; the procedure of Technical Information Bulletin 117, "Requirements, Test Procedure and Apparatus for Testing the Flame Retardance of Resilient Filling Materials Used in Upholstered Furniture" (referred to herein as Calif. 117), published by the State of California, Department of Consumer Affairs, Bureau of Home Furnishings; the Michigan Mattress Test; and exposure to a blowtorch.

The modification of UL 94 consists of starting to count flame time from the start of ignition, whereas in the standard procedure flame time is counted 60 seconds after the start of ignition.

The Michigan Mattress Test consists of rolling up a mattress, tieing it either in the center or at both ends, stuffing newspaper in the center core of the rolled-up mattress, placing the mattress at an angle, and igniting the paper. The mattress will either be totally consumed by the fire, or the fire will self-extinguish after a period of time with the mattress being only partly damaged or consumed.

Exposure to a blowtorch is performed by suspending a piece of foam vertically and applying the flame of a propane blowtorch to the center of the foam piece for a period of time ranging from 10 seconds to 3 minutes. At the end of that time period the torch flame is removed and a visual observation is made of the damage done to the foam piece.

The following are the identities of various ingredients used in the examples. TDI 67/33 is a mixture of 2,4-tolylene diisocyanate and 2,6-tolylene diisocyanate in a 67/33 ratio. FYROL ® FR-2 is tris (1,3-dichloropropyl) phosphate, and FYROL ® CEF is tris (2-chloroethyl) phosphate, both sold by Stauffer. NCM is N-cocomorpholine. MM-70 is a mixture of 70% methoxyethylmorpholine and 30% dimethylpiperazine, sold by Texaco. C-4 is a 50% solution of stannous octoate in di(2-ethylhexyl) phthalate, sold by Witco.

Examples 1 through 14 are hand batches, prepared in the laboratory.

EXAMPLES 1–5

| Example | 1 | 2 | 3 | 4 | 5 |
|---|---|---|---|---|---|
| Polyester prepared from diethylene glycol, adipic acid, and trimethylolethane; OH no. 56 | 100.0 | 100.0 | 100.0 | 100.0 | 100.0 |
| TDI 80/20 | 30.0 | 30.0 | 30.0 | 33.2 | 46.5 |
| Black pigment dispersion | 6.0 | 6.0 | — | — | — |
| Water | 0.67 | 0.67 | 2.17 | 0.67 | 0.67 |
| M66-82 | 1.0 | 1.0 | 1.0 | 1.0 | 1.0 |
| NCM | 1.85 | 1.85 | 1.5 | 1.5 | 1.5 |
| C-4 | 0.50 | 0.20 | 0.15 | 0.15 | 0.20 |
| Tris(methyoxymethyl)tris (hydroxymethyl) melamine, 70% in water | 5.0 | 5.0 | — | 10.0 | 15.0 |
| Hexa (methoxymethyl) melamine | — | — | 20.0 | 10.0 | — |
| FYROL ® FR-2 | 20.0 | 20.0 | 20.0 | 10.0 | 10.0 |
| THERMOLIN ® 101 | — | — | 1' | 10.0 | 10.0 |

-continued

| Example | 1 | 2 | 3 | 4 | 5 |
|---|---|---|---|---|---|
| Hydrated alumina, IMCO 753 | 50.0 | 75.0 | 75.0 | 75.0 | 75.0 |
| Cream time, sec. | 10 | 15 | 20 | 15 | 10 |
| Rise time, sec. | 120 | 180 | 240 | 180 | 120 |

EXAMPLES 6–9

| Example | 6 | 7 | 8 | 9 |
|---|---|---|---|---|
| Polyester prepared from diethylene glycol, adipic acid, and trimethylol ethane; OH no. 56 | 100.0 | 100.0 | 100.0 | 100.0 |
| TDI 80/20 | 30.0 | 30.0 | 30.0 | 30.0 |
| Water | 2.2 | 2.2 | 2.2 | 2.2 |
| M66-82 | 1.0 | 1.0 | 1.0 | 1.0 |
| NCM | 0.5 | 0.5 | 0.5 | 0.5 |
| MM-70 | 0.75 | 0.75 | 0.75 | 0.75 |
| C-4 | 0.15 | 0.15 | 0.15 | 0.15 |
| Hexa (methoxymethyl) melamine | 10.0 | 20.0 | 10.0 | 20.0 |
| FYROL® FR-2 | 20.0 | 20.0 | 20.0 | 20.0 |
| Hydrated alumina, IMCO 753 | 50.0 | 50.0 | 75.0 | 75.0 |
| Index | 103 | 103 | 103 | 103 |
| Cream time, sec. | 15 | 15 | 15 | 15 |
| Rise time, sec. | 210 | 220 | 180 | 190 |
| Density, lb./cu.ft. | 5.42 | 5.37 | 5.65 | 5.98 |
| UL 94-Unaged | | | | |
| Burn time, sec. | 70.2 | 68.1 | 70.0 | 77.0 |
| Burn extent, in. | 1.10 | 1.02 | 1.00 | 0.97 |

The foams from Examples 1–9 all had good intumescent properties, although those from Examples 1 and 2, which had a low level of substituted melamine as a char former, were noticeably inferior in intumescence to the others. Attempts were made to pre-disperse the hydrated alumina in a blend of the substituted melamine and the flame retardant, but the viscosity of the dispersion was so high that it was necessary to add a portion of the polyester polyol to it.

EXAMPLES 10–12

| Example | 10 | 11 | 12 |
|---|---|---|---|
| Polyester prepared from diethylene glycol, adipic acid, and tri-methylolethane; OH no. 56 | 100.0 | 100.0 | 100.0 |
| TDI 80/20 | 30.0 | 30.0 | 31.0 |
| Water | 2.2 | 2.2 | 2.2 |
| M66-82 | 1.0 | 1.0 | 0.75 |
| NCM | 0.75 | 0.5 | 1.0 |
| MM-70 | 0.75 | 0.75 | 0.5 |
| C-4 | 0.15 | 0.15 | 0.15 |
| Hexa (methoxymethyl)melamine | 20.0 | 20.0 | 20.0 |
| L-1217 | — | — | 10.0 |
| FYROL® EFF | 40.0 | — | — |
| FYROL® FR-2 | — | 20.0 | 20.0 |
| THERMOLIN® 101 | — | 10.0 | 10.0 |
| Hydrated alumina, IMCO 753 | 75.0 | 75.0 | 75.0 |

In order to alleviate the problem of high viscosity, higher levels of flame retardants were used together with the substituted melamine to predisperse the hydrated alumina in Examples 10 and 11; and in Example 12, a low viscosity linear polyester polyol (L-1217) was also added to the dispersion. All gave viscosities which were low enough to be handled as a separate stream, without the necessity for adding any of the high viscosity polyester. The dispersion of Example 12 had the lowest and most satisfactory viscosity. The foams produced in each of these examples had excellent intumescence.

EXAMPLES 13–14

| Example | 13 | 14 |
|---|---|---|
| Polyester prepared from diethylene glycol, adipic acid, and trimethylolethane; OH no. 56 | 100.0 | 100.0 |
| TDI 80/20 | 31.0 | 35.0 |
| Water | 2.2 | 2.6 |
| M66-82 | 0.5 | 0.5 |
| NCM | 1.25 | 1.25 |
| MM-70 | 0.4 | 0.4 |
| C-4 | 0.15 | 0.3 |
| Hexa (methoxymethyl) melamine | 20.0 | 20.0 |
| FYROL® CEF | 10.0 | 35.0 |
| FYROL® FR-2 | 40.0 | 25.0 |
| Hydrated alumina | 90.0 | 110.0 |
| Index | 105 | 105 |
| Cream time, sec. | 10 | 10 |
| Rise time, sec. | 270 | 300 |

These examples illustrate the use of higher levels of hydrated alumina, added as a dispersion in a blend of the substituted melamine and the flame retardants. The dispersions were low enough in viscosity, without dilution with the polyester, to be handled by hand batch techniques, but the viscosity was not as low as that of similar dispersions which also contained a low viscosity linear polyester. It was judged to be too high for optimum use as a separate stream in a one-shot foam-making machine. The foams from these examples had excellent intumescent properties.

EXAMPLE 15

This is a comparative example, from a plant-scale production run, made according to the disclosure of U.S. Pat. No. 4,139,501. The reaction mixture contained amounts of melamine derivative and of flame retardant lower than those of the present invention, and did not contain hydrated alumina. The formulation was as follows.

| Polyester prepared from diethylene glycol, adipic acid, and trimethyolethane; OH no. 56 | 100.0 |
|---|---|
| TDI 67/33 | 30.0 |
| Tris(methoxymethyl)tris (hydroxymethyl)melamine, 70% in water | 5.0 |
| FYROL® FR-2 | 15.0 |
| Water | 0.67 |
| NCM | 1.0 |
| M66-82 | 1.0 |
| C-4 | 0.3 |
| Pigment dispersion | 6.0 |
| Index | 107 |
| Density, lb./cu.ft. | 3.70 |
| Radiant panel flame spread index, ASTM E162-78 | 550 |

Examples 16 through 23 were made on a pilot plant continuous one-shot, foam making machine using a conveyor declination of 1°, in the form of buns having a generally rectangular cross section. In Examples 16 through 20 the buns had a width of approximately 34 inches, while in Examples 21–23 the width was approximately 38 inches.

In Examples 16 and 17, the hydrated alumina, polyester, hexa (methoxymethyl) melamine, and FYROL FR-2 were blended into a uniform dispersion which was introduced as a separate stream into the mixing head of the foam machine. A similar procedure was followed for Example 18, except that the THERMOLIN 101 was also incorporated into the dispersion. In Examples 19, 20, 22 and 23 the hydrated alumina, LEXOREZ 1100-220, hexa(methyoxymethyl) melamine FYROL FR-2, and THERMOLIN 101 were blended into a uniform dispersion which was introduced as a separate stream into the mixing head. In Example 21 a similar procedure was followed except that the dispersion did not contain THERMOLIN 101.

EXAMPLES 16–19

| Example | 16 | 17 | 18 | 19 |
|---|---|---|---|---|
| Polyester prepared from diethylene glycol, adipic acid, and trimethylolethane; OH no. 56 | 100.0 | 100.0 | 100.0 | 100.0 |
| TDI 80/20 | 29.0 | 31.0 | 29.5 | 31.0 |
| Water | 2.0 | 2.2 | 2.2 | 2.2 |
| M66-82 | 1.0 | 1.0 | 1.0 | 0.75 |
| NCM | 1.0 | 1.0 | 1.0 | 1.0 |
| MM-70 | 0.75 | 0.75 | 0.5 | 0.5 |
| C-4 | 0.15 | 0.15 | 0.15 | 0.15 |
| Hexa(methoxymethyl) melamine | 20.0 | 20.0 | 20.0 | 20.0 |
| FYROL® FR-2 | 20.0 | 40.0 | 20.0 | 20.0 |
| THERMOLIN® 101 | — | — | 10.0 | 10.0 |
| LEXOREZ® 1100-220 | — | — | — | 10.0 |
| Hydrated alumina | 50.0 | 75.0 | 75.0 | 75.0 |
| Index | 105 | 105 | 100 | 95 |
| Radiant panel flame spread index, ASTM E162-78 | 323 | 281 | 135 | 182 |

In additional to the radiant panel flame spread index, the properties summarized in Table I were measured.

TABLE I

| Example | 16 | 17 | 18 | 19 |
|---|---|---|---|---|
| Density, lb./cu. ft. | 4.61 | 6.38 | 5.86 | 5.87 |
| ILD 2" 25% | 28.0 | 39.0 | 32.5 | 33.0 |
| ILD 2" 65% | 64.0 | 89.0 | 74.0 | 90.0 |
| Modulus 2" 65/25 | 2.29 | 2.28 | 2.28 | 2.73 |
| ILD 4" 25% | 38.0 | 54.0 | 43.0 | 44.0 |
| ILD 4" 65% | 91.0 | 129.0 | 104.0 | 111.0 |
| Modulus 4" 65/25 | 2.39 | 2.39 | 2.42 | 2.52 |
| Resilience, % | 38.8 | 26.4 | 26.4 | 25.0 |
| Tensile strength, lb./sq. in. | 12.2 | 13.8 | 11.4 | 17.2 |
| Elongation, % | 190 | 170 | 160 | 190 |
| Tear strength, lb./in. | 2.0 | 2.3 | 2.1 | 2.9 |
| Flammability: | | | | |
| UL 94-unaged | pass | fail | pass | fail |
| -aged | — | fail | — | pass |
| Flammability: | | | | |
| Calif. 117-unaged | fail | — | pass | pass |
| -aged | — | — | — | pass |

EXAMPLES 20–23

| Example | 20 | 21 | 22 | 23 |
|---|---|---|---|---|
| Polyester prepared from diethylene glycol, adipic acid, and trimethylolethane; OH no. 56 | 100.0 | 100.0 | 100.0 | 100.0 |
| TDI 80/20 | 31.0 | 34.6 | 34.6 | 37.7 |
| Water | 2.2 | 2.2 | 2.2 | 2.5 |
| M66-82 | 0.75 | 0.5 | 0.5 | 0.5 |
| NCM | 1.5 | 1.25 | 1.0 | 1.25 |
| MM-70 | 0.4 | 0.4 | 0.4 | 0.4 |
| C-4 | 0.3 | 0.15 | 0.15 | 0.15 |
| Hexa(methoxymethyl) melamine | 20.0 | 20.0 | 20.0 | 20.0 |
| FYROL® FR-2 | 20.0 | 40.0 | 20.0 | 20.0 |
| THERMOLIN® 101 | 10.0 | — | 10.0 | 10.0 |
| LEXOREZ® 1100-220 | 10.0 | 10.0 | 10.0 | 10.0 |
| Hydrated alumina | 90.0 | 90.0 | 90.0 | 90.0 |
| Index | 95 | 105 | 105 | 105 |
| Radiant panel flame spread index, ASTM E162-78 | 139 | 70 | 75 | 59 |

In addition to the radiant panel flame spread index, the properties summarized in Table II were measured.

TABLE II

| Example | 20 | 21 | 22 | 23 |
|---|---|---|---|---|
| Density, lb./cu. ft. | 6.02 | 6.87 | 6.09 | 5.21 |
| ILD 2" 25% | 33.5 | 48.0 | 42.0 | 28.5 |
| ILD 2" 65% | 91.5 | 154.0 | 110.0 | 76.5 |
| Modulus 2" 65/25 | 2.73 | 3.21 | 2.62 | 2.68 |
| ILD 4" 25% | 43.5 | 58.5 | 50.5 | 40.5 |
| ILD 4" 65% | 120.0 | 162.0 | 135.0 | 104.0 |
| Modulus 4" 65/25 | 2.76 | 2.77 | 2.67 | 2.57 |
| Resilience, % | 25.0 | 33.3 | 3.19 | 29.2 |
| Tensile strength, lb./sq. in. | 15.5 | 17.9 | 14.9 | 13.5 |
| Elongation, % | 170 | 130 | 140 | 150 |
| Tear strength, lb. in. | 2.7 | 2.5 | 2.7 | 2.4 |
| Flammability: | | | | |
| UL 94-unaged | pass | fail | fail | fail |
| -aged | fail | — | — | — |
| Calif. 117-unaged | pass | pass | pass | pass |
| -aged | pass | pass | pass | pass |

Comparison of the flame spread index of Examples 16–23 with that of comparative Example 15 illustrates the significant advantages over the prior art provided by this invention. The foams made according to the invention have outstanding resistance to burning under the intense ignition conditions of ASTM E162-78, even though some of them technically do not pass the less rigorous test conditions of UL 94 and Calif. 117. These foams may burn slowly on the surface and produce a completely charred surface, while the interior of the test piece remains unchanged, because of their intumescent nature. The long burning time and apparent extent of burn, which is in actuality only a surface char causes them to be rated as "failing" these less severe tests.

Comparisons of Examples 19 and 20 with Examples 22 and 23 with respect to ASTM E162-78 flame spread shows the improvement which can be attained when the foam is made at a positive index (105) rather than a negative index (95).

EXAMPLE 24

A mattress having dimensions 72×26×3½ inches and a density of 5.80 lb./cu. ft. was prepared from the formulation used in Example 18, and was subjected to the Michigan Mattress Test. Within one minute after the paper was ignited and flaming there was some flaming of the mattress itself with moderate smoke formation. Between the second and sixth minute flaming of the mattress continued, with smoke generation diminishing from moderate to low and with char formation on the mattress. After seven to nine minutes the fire appeared to be out, and smoke generation was very low. After ten minutes the mattress was unrolled. A heavy char layer was found on the surface which had been in contact with the flaming paper, and along the top edge; but the greater portion of the mattress, the interior and the other surfaces, was undamaged.

EXAMPLES 25–27

Using the foams from Examples 21, 22, and 23, mattresses having dimensions 72×35×3 inches were made, and were subjected to the Michigan Mattress Test. Each of these mattresses was rolled up along its 35 inch axis around a 10 inch diameter tube, and tied together at each end. The tube was removed and the rolled mattress was placed on the ground outdoors, at an angle with one end resting on a 3 inch angle iron to form a chimney with air entering at the bottom. Eight sheets of newspaper 23×28 inches were then loosely crushed into individual balls of about 6 inches diameter, placed into the center hollow of each mattress roll, and ignited from the top.

In Example 25 (foam from Example 21), during the first four minutes after ignition there was heavy flaming from the paper with some flaming of the adjacent foam surface, the formation of a heavy char layer, and moderate smoke generation. Between four and nine minutes the flames died down, and went out at the nine minute mark although there was still some smoke being generated. The mattress was unrolled and found to have a heavy char layer on the surface which had been contacted by the flame, about half of the total surface. There was no smoldering of the unburned foam.

In Example 26 (foam from Example 22), during the first four minutes there was heavy flaming of the paper and some flaming of the foam, with moderate to heavy smoke generation. Between five and twelve minutes the flames died down, and smoke generation was moderate to heavy. Some fire broke through to the outside of the mattress where the roll was tied together with wire. The flames had spontaneously extinguished at the fifteen and one-quarter minute mark. When the mattress was unrolled, there was somewhat more damage than in Example 25, but the greater part was not damaged. There was no smoldering.

In Example 27, (foam from Example 23) similar results were obtained. There was heavy flaming and char formation during the first three minutes; the flames were dying down during the next six minutes, with the formation of a very heavy char layer; and during the following three minutes the flames were flickering, and then went out at the twelve minute mark. There was a moderate amount of white smoke generated during the last three minutes. The mattress was unrolled and found to have a heavy char layer on the upper half, but no other damage. There was no smoldering.

What is claimed is:

1. In a process for the manufacture of a flexible, resilient, flame retardant and intumescent polyurethane foam from a reaction mixture comprising at least one polyester polyol, said polyester polyol being the reaction product of at least one polyhydric alcohol with at least one polycarboxylic acid or anhydride or with a lactone and having a hydroxyl functionality of greater than 2 and a molecular weight of from about 400 to about 5000; at least one organic polyisocyanate; at least one blowing agent; at least one surfactant; at least one catalyst; at least one melamine derivative of the formula

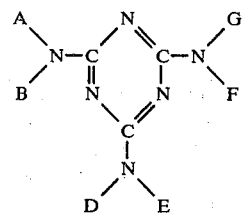

wherein A, B, D, E, F, and G are selected from the group consisting of hydrogen, methylol, and ROCH$_2$— in which R is an alkyl radical having from 1 to 4 carbon atoms, with the proviso that in said formula at least one of A, B, D, E, F, and G is methylol or ROCH$_2$—; and at least one flame retardant selected from the group consisting of triesters of phosphoric acid, halogenated triesters of phosphoric acid, and halogenated hydrocarbons: the improvement wherein the amount of said melamine derivative is from about 10 to about 30 parts by weight per 100 parts by weight of said polyester polyol; the amount of said flame retardant is from about 20 to about 60 parts by weight per 100 parts by weight of said polyester polyol; and wherein said reaction mixture also comprises from about 50 to about 200 parts by weight per 100 parts by weight of said polyester polyol of hydrated alumina; whereby the flame retardancy and intumescent properties of said polyurethane foam are increased.

2. The process of claim 1 wherein the amount of said melamine derivative is from about 15 to about 25 parts by weight per 100 parts by weight of said polyester polyol.

3. The process of claim 1 wherein said melamine derivative is hexa(methyoxymethyl)melamine.

4. The process of claim 1 wherein the amount of said flame retardant is from about 30 to about 40 parts by weight per 100 parts by weight of said polyester polyol.

5. The process of claim 1 wherein said flame retardant is a halogenated triester of phosphoric acid.

6. The process of claim 5 wherein said triester is tris (1,3-dichloropropyl) phosphate.

7. The process of claim 5 wherein said triester is tetrakis (2-chloroethyl) ethylene diphosphate.

8. The process of claim 1 wherein the amount of hydrated alumina is from about 90 to about 120 parts by weight per 100 parts by weight of said polyester polyol.

9. The process of claim 1 wherein said polyurethane foam is made continuously by the one-shot method.

10. The process of claim 1 wherein said hydrated alumina, said polyester polyol, said melamine derivative, and said flame retardant are first blended into a uniform dispersion before being combined with the other components of said reaction mixture.

11. The process of claim 1 wherein said reaction mixture also comprises from about 5 to about 20 parts by weight per 100 parts by weight of said polyester polyol of a second polyester polyol said second polyester polyol being a linear polyester prepared from a glycol and an aliphatic dibasic acid and having a viscosity of from about 400 to about 500 cps at 25° C., and wherein said hydrated alumina, said second polyester polyol, said melamine derivative, and said flame retardant are first blended into a uniform dispersion before being combined with the other components of said reaction mixture.

12. The process of claim 11 wherein the amount of said second polyester polyol is from about 10 to about 15 parts by weight per 100 parts by weight of said polyester polyol.

13. The process of claim 1 wherein the index of said reaction mixture is at least 100.

14. The process of claim 1 wherein said polyisocyanate is a mixture of 2,4-tolylene diisocyanate and 2,6 tolylene diisocyanate in a ratio of 80/20.

15. The product of the process of claim 1.
16. The product of the process of claim 2.
17. The product of the process of claim 3.
18. The product of the process of claim 4.
19. The product of the process of claim 5.
20. The product of the process of claim 6.
21. The product of the process of claim 7.
22. The product of the process of claim 8.
23. The product of the process of claim 9.
24. The product of the process of claim 10.
25. The product of the process of claim 11.
26. The product of the process of claim 12.
27. The product of the process of claim 13.
28. The product of the process of claim 14.

* * * * *